April 9, 1968 S. C. SCHUMAN 3,377,396
REACTION OF ETHANE, HYDROGEN CHLORIDE AND SULFUR
Filed June 7, 1965 2 Sheets-Sheet 1

INVENTOR
SEYMOUR C. SCHUMAN

INVENTOR
SEYMOUR C. SCHUMAN

United States Patent Office 3,377,396
Patented Apr. 9, 1968

3,377,396
REACTION OF ETHANE, HYDROGEN CHLORIDE AND SULFUR
Seymour C. Schuman, Rocky Hill, N.J.
(360 Jefferson Road, Princeton, N.J. 08540)
Filed June 7, 1965, Ser. No. 461,824
8 Claims. (Cl. 260—656)

ABSTRACT OF THE DISCLOSURE

Ethane, elemental sulfur and hydrogen chloride are contacted at elevated temperatures to produce saturated and unsaturated chlorine derivations of ethane, particularly, substantial quantities of vinyl chloride.

---

Figure 1:
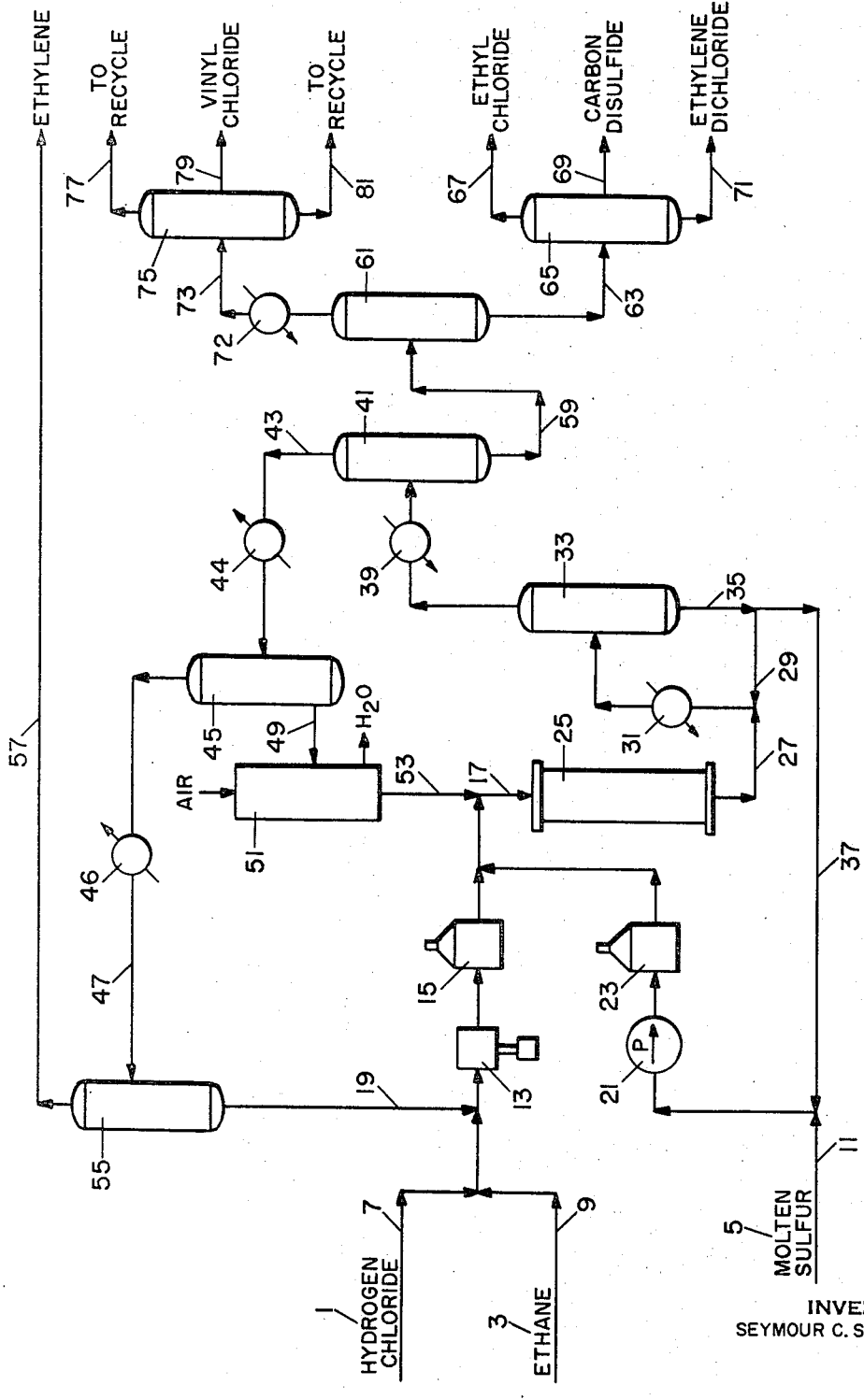

This invention involves the reaction of a feed stream containing a substantial amount of ethane with hydrogen chloride and elemental sulfur, particularly, although not necessarily exclusively, for the production of vinyl chloride.

Vinyl chloride is an important chemical of commerce, useful in making various types of polymers. It is conventionally produced from acetylene, ethylene, or both. In the acetylene process, acetylene is contacted with hydrogen chloride to produce vinyl chloride as the simple addition product. In the ethylene process, ethylene is reacted with chlorine to produce vinyl chloride together with hydrogen chloride. When both acetylene and ethylene are used, the ethylene is chlorinated and the hydrogen chloride produced from this reaction is utilized to convert acetylene to additional vinyl chloride. The ethylene process utilizes relatively costly raw materials (ethylene and chlorine) which are converted to vinyl chloride in a two-step reaction which is difficult and relatively unselective. In the acetylene process, where the combination with hydrogen chloride is more simple and the reaction more specific, the high cost of acetylene (approximately twice that of ethylene) and its relatively complex method of manufacture represent the major reasons for the ultimate high cost of vinyl chloride produced by this process.

By contrast with these conventional processes, the process of the present invention is a single-step process which utilizes a very inexpensive carbon source, namely, ethane. In fact, the amount of ethane available in nature and that produced in the petroleum industry is so substantial that most of the available ethane is used only as fuel, for which it has minimal value.

I have discovered that when ethane, elemental sulfur, and hydrogen chloride are contacted at elevated temperature, substantial quantities of vinyl chloride, ranging from 40% to 90% of that stoichiometrically possible, can be produced. The reaction may be carried out with or without one or more contact agents in the reaction zone. High ethane conversions may be obtained and substantial quantities of vinyl chloride produced at temperatures from 700° F. to 1450° F., pressures from substantially atmospheric to 250 p.s.i.g., and with feeds containing a wide range of molar quantities of sulfur and hydrogen chloride relative to ethane.

In addition to the vinyl chloride, substantial quantities of ethylene and lesser quantities of ethyl chloride may be produced, and at certain conditions still smaller amounts of ethylene dichloride are likewise obtained. If desired, the by-products may be sold as such, all being highly useful chemical commodities having a much greater value than that of the raw materials from which they are obtained. Alternatively, according to another feature of my invention, the by-products may be recycled to the contact zone to increase the ultimate yield of vinyl chloride. In either event, over a wide range of reaction conditions, and with different contact agents, my process provides good yields of products all of which are substantially more valuable than the raw materials fed.

The efficiency of the present process is increased by the fact that unreacted hydrogen chloride and sulfur can be readily recycled to the contact zone, and by the fact that the hydrogen sulfide which is produced may be recovered almost quantitatively to elemental sulfur by conventional treatment involving combustion with air, so that little or no net quantities of elemental sulfur are consumed by the process.

Uncontrolled reactions leading to excessive quantities of carbon disulfide occur only at the upper limits of temperature and pressure which I specify. Yields of tars and coke likewise become significant only at these upper limits.

Although I do not wish to be limited by an theoretical considerations, I believe that the process of this invention may involve the following chemical reactions:

$$C_2H_6 + \tfrac{1}{2}S_2 \rightarrow C_2H_4 + H_2S \tag{1}$$
$$C_2H_4 + HCl \rightarrow C_2H_5Cl \tag{2}$$
$$C_2H_5Cl \rightarrow C_2H_3Cl + H_2 \tag{3}$$
$$H_2 + \tfrac{1}{2}S_2 \rightarrow H_2S \tag{4}$$
$$C_2H_6 + S_2 \rightarrow C_2H_2 + 2H_2S \tag{5}$$
$$C_2H_2 + HCl \rightarrow C_2H_3Cl \tag{6}$$
$$C_2H_3Cl + HCl \rightarrow C_2H_4Cl_2 \tag{7}$$

The concomitant occurrence of these various reactions would result in the fact that the relative amounts of the various possible reaction products may be radically altered by changing the relative quantities of the several feeds, by using specific contact agents which may catalyze one or more reactions preferentially, and by varying reaction conditions. For example, when operating with relatively low quantities of hydrogen chloride, substantial quantities of ethylene are produced together with vinyl chloride. The use of contact agents, either simple agents such as for example bauxite, clay or iron oxide, or prepared catalysts such as chromia and potassia deposited on activated alumina or supported molybdenum oxide activated by phosphoric acid, tends to increase yields of vinyl chloride and inhibit the formation of ethylene dichloride. However, by increasing reaction pressure, formation of all organic halides is promoted at the expense of ethylene.

Thus, one set of feed mixtures and reaction conditions may be desirable in one commercial situation, while another set may be preferable at another geographical location. For example, one user of my process may desire to produce vinyl chloride with substantial quantities of by-product ethylene for ultimate use of the latter in making polyethylene. Another user might feed such by-product ethylene into an existing conventional plant to produce additional yields of vinyl chloride. Still another user might desire to maximize ethyl chloride yields to ultimately produce tetraethyl lead together with the vinyl chloride always substantially produced.

It is also feasible, according to this invention, to operate a given plant at maximum yields of vinyl chloride with minimum by-products at such times as is desirable, and, at other times, with high yields of one or more by-products when these materials are in good demand or when there is an over-supply of vinyl chloride.

These specific processes are delineated in Table 1, below, which tabulates the reaction of various feed mixtures containing sulfur and hydrogen chloride to produce vinyl chloride together with other valuable by-products such as ethylene, ethyl chloride and ethylene dichloride. Examples 1–8 illustrate the use of the process feeding ethane. These examples show that it is possible to produce vinyl chloride in good yields together with various by-products over a wide range of process conditions with or without contact agents. In all of these examples, ethane conversions are high, and vinyl chloride is substantially the major product of the reaction. Yields of undesirable tar are low. As shown in these examples, it is possible to vary the products obtained by selection of appropriate feed rates, contact agents, and other operating conditions.

Examples 9–12, illustrated in Table 1, show that it is possible to recycle ethylene, ethyl chloride and ethylene dichloride, to produce additional yields of vinyl chloride. Here, again, although the process conditions are approximately those used for the ethane feed in Examples 1–8, a wide variety of conditions exists, each of which produces a specific product distribution.

As those skilled in the art will recognize from these examples, a large number of contact agents may be effective for the process of this invention because the mechanism of the reaction process may involve many different reactions as shown in Equations 1 to 7 above. Thus, a given catalyst may be desirable in one case or undesirable in another, according to the products which may be sought. Silica, alumina, and metals of Groups IV, V, VI, VII and VIII either supported or unsupported, have been found to be effective for many of the reactions tabulated, as have many of the rare earth elements of atomic numbers between 59 and 72. Elements which yield catalytically active sulfides, such as molybdenum, chromia, vanadium, nickel, cobalt, iron or tungsten will be especially effective in some cases. Promotion with minor quantities of alkali metal oxides, particularly potassium oxide, may be valuable to reduce yields of tar and/or coke.

The ethane feed may be derived from natural sources such as natural gas or petroleum, or from processing operations in the natural gas, petroleum or coal industries, including cracking, reforming, coking and the like. In many cases, such feeds may contain substantial quantities of materials other than ethane such as methane, ethylene or hydrogen sulfide. Such extraneous materials need not be removed from the feed before processing, and may be advantageous in some respects.

Elemental sulfur may be obtained from any convenient source. In most cases, hydrogen sulfide produced in the reaction may be reconverted to elemental sulfur using air so that little or no net elemental sulfur is required in the overall process. However, the total reactor feed will probably require from 0.5 to 2.5 moles of $S_2$ per mole of ethane in the total feed.

Similarly, hydrogen chloride is obtained from conventional sources, particularly where available as a by-product from the chlorination of hydrocarbons. At least 0.5 mole, and possibly as much as 2.5 moles of hydrogen chloride probably will be required per mole of ethane in the total feed.

Depending on whether a catalyst is used, on the desired reaction products, and on the other reaction conditions, the temperature of my process may be from 700° F. to 1450° F. In certain cases, multiple reaction zones may be employed at different temperatures within the above range, particularly when it is desired to produce maximum vinyl chloride yields in a single pass operation.

The reaction pressure is substantially atmospheric, i.e. between 5 p.s.i.g. and 250 p.s.i.g. Higher pressures result in more economic reactor and recovery system designs, but also produce more ethyl chloride and ethylene dichloride at the expense of vinyl chloride.

It is well known that in high temperature reactions of hydrocarbons, particularly those involving unsaturated compounds, carbon may be produced in the reaction zone, ultimately deactivating catalyst or blocking the flow through the reactor system. In the process of my invention, however, such carbon is a negligible factor so that regenerations or burnouts need be practiced very infrequently. Actually, it has been found that such regenerations can be accomplished in many cases by shutting off all feeds other than sulfur and passing the latter through the reaction system alone; apparently such a regeneration occurs as a result of the reaction of polymeric deposits with sulfur to form carbon disulfide.

Figure 2:
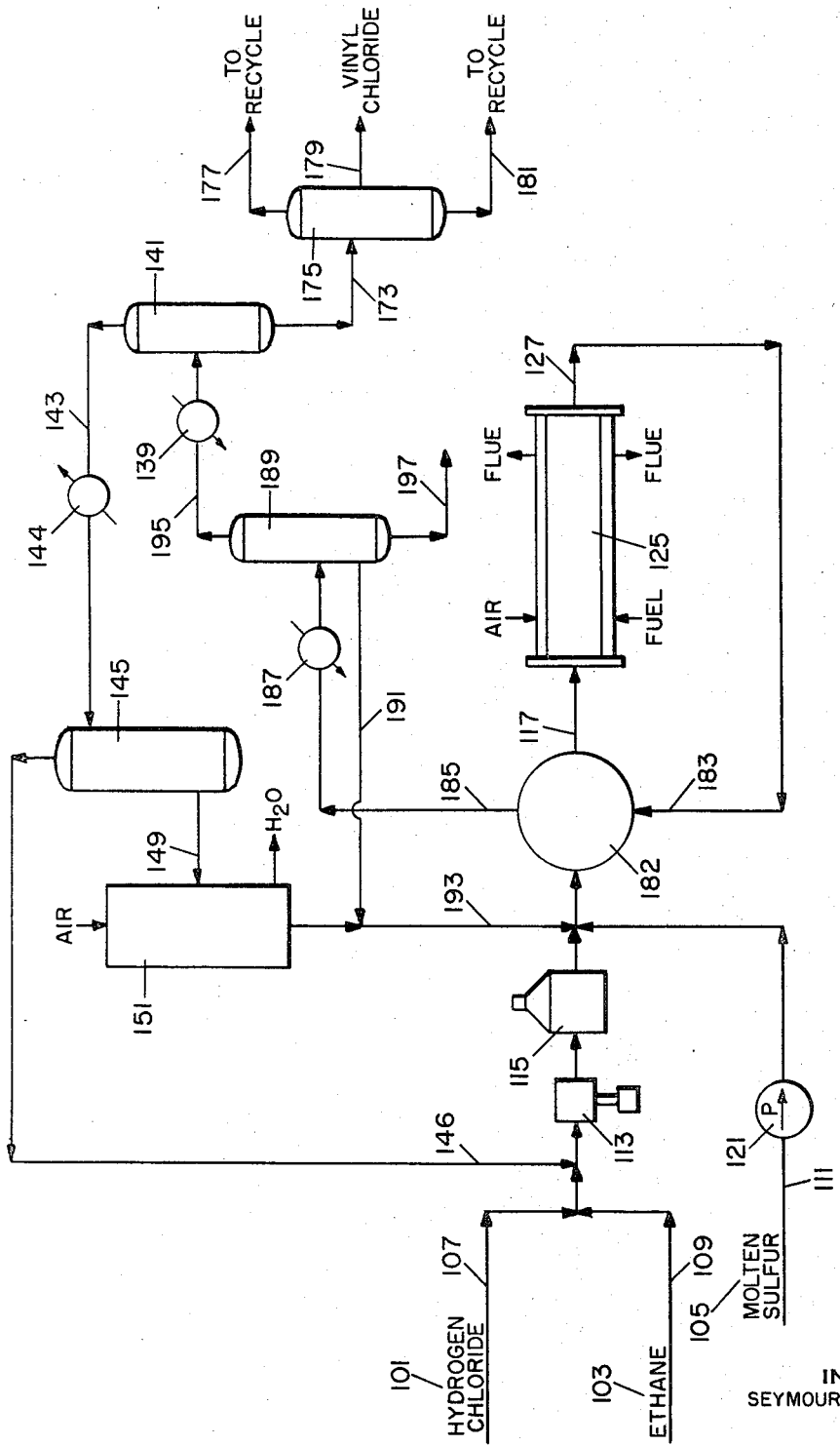

FIGURES 1 and 2 illustrate diagrammatically two systems of apparatus which may be used to practice the process steps of the present invention.

FIGURE 1 shows a plant for producing by-products in addition to vinyl chloride. In FIGURE 1, hydrogen chloride and ethane from sources 1 and 3 are passed through lines 7 and 9, respectively, and are then compressed in compressor 13 and heated in 15 before entering the reactor at 17.

Recycled hydrogen chloride and ethane, obtained as will be described from line 19, are similarly fed to the reactor. Molten sulfur from a source 5 passes through line 11 and, in this case, is separately pumped in by a pump 21 and reheated at 23 to join the hydrogen chloride-ethane stream and similarly enter the reactor through line 17.

Recycled sulfur, obtained as will be described from line 37, likewise enters the reactor at 17. In addition, sulfur regenerated from the hydrogen sulfide formed in the reaction passes from sulfur regeneration plant 51 through line 53 to enter the reactor at 17.

The reactor 25 is a corrosion resistant, pressure-tight chamber suitable for carrying out the desired reactions. Generally, it may be a large cylindrical chamber, or a group of tubes surrounded by appropriate heat transfer fluids. The chamber or tubes may or may not contain contact agents, as will be understood from Table 1, above. Because the reactions which occur may be endothermic or exothermic depending on the feed quantities employed and the reaction conditions, reactor 25 may be heated, cooled, or merely insulated. In the specific embodiment of FIGURE 1, reactor 25 is a simple cylindrical vessel charged with bauxite promoted with iron oxide and potassia. In this case, the reaction is slightly endothermic and the various feed streams are preheated to enter reactor 25 slightly above the average reaction temperature. Thus, in this case, reactor 25 is conveniently insulated to minimize heat losses, without heat transfer devices being employed.

The products issuing from reactor 25 through line 27 are quenched with molten sulfur from line 29, further cooled in exchanger 31, and then enter sulfur tower 33. In this tower, liquid sulfur is removed from the bottom, whereas all of the other products proceed overhead in the gaseous state. Part of the liquid sulfur proceeds from the tower bottoms through line 35 to provide the quench stream at line 29 as described above. The remaining bottoms from the tower are passed through line 37 and recycled back to the inlet of the reactor as described.

The overhead from the sulfur tower is cooled in exchanger 39 to substantially liquefy vinyl chloride, ethyl chloride, carbon disulfide, and ethylene dichloride; these are separated from the remaining gaseous products in principal splitter 41. The liquid products pass through line 59 into fractionator 61, where vinyl chloride is separated out. The vinyl chloride proceeds overhead from tower 61, is reliquefied by cooler 72, and passes through line 73 into superfractionator 75 wherein a pure vinyl chloride product is obtained as a heart-cut from the tower through line 79. The superfractionator overhead and bottoms, relatively small in quantity, pass through lines 77 and 81 and may be ultimately recycled to the reactor through lines not shown.

The bottoms from tower 61 pass through line 63 into fractionator 65 from which ethyl chloride is obtained as an overhead stream in line 67, carbon disulfide from the middle of the tower through line 69 and ethylene dichloride from the bottom of the tower through line 71. In this example of my invention, these materials are withdrawn as final products; however, they may be further purified by conventional techniques.

The overhead from splitter 41 passes through line 43 and is cooled below −40° F. and passed to tower 45 from which hydrogen sulfide is obtained as a bottoms stream. This stream passes into a conventional oxidation process for conversion to sulfur as schematically shown by 51. The sulfur produced, heated to the required temperature, passes through line 53 to enter reactor 25 through line 17 as previously described.

The overhead from tower 45 is substantially cooled in refrigeration system 46 to liquefy ethane and hydrogen chloride which then enter tower 55. Ethylene issues overhead from tower 55 through line 57 and is ultimately obtained as a product, with or without further purification. The bottoms from tower 55, substantially ethane and hydrogen chloride, pass through line 19 from which they are ultimately recycled to the reactor.

Although not shown in FIGURE 1, it should be noted that, in commercial practice, energy economization may be practiced to a considerable degree. For example, in the combustion of hydrogen sulfide to sulfur, considerable energy is released capable of supplying heat required in heaters 15 or 23. Similarly, it will be realized that suitable corrosion resistant materials would be provided in all of the equipment shown in FIGURE 1. Actually, no severe corrosion problems exist, primarily because water is not a feed to the system or a product, so rated out in tower 141 and passed to superfractionator 175 essentially as in FIGURE 1. The product vinyl chloride, in this case substantially the only product of the process, issues as a heart-cut from the fractionator through line 179.

The vapor effluent from tower 141, substantially hydrogen sulfide, hydrogen chloride, ethylene and ethane is cooled by refrigeration system 144 to liquefy hydrogen sulfide which is separated out in tower 145, converted to sulfur as before in conversion unit 151, and recycled back to the reactor via lines 193 and 117. The vapor effluent from tower 145, substantially ethane, ethylene, and hydrogen chloride is recycled back to the feed system via line 146, in this case without further separation, since all of these components are useful to produce additional vinyl chloride.

In this case, a small amount of tar is produced and is withdrawn from the system at the bottom of the sulfur tower 189 through line 197. This tar is the only product of the process in addition to vinyl chloride.

TABLE 1

| Ex. | 100 Grams/Hour Feed | | | | Maximum Temp., °F. | Pressure, p.s.i.g. | Products, Grams/Hour | | | | | | |
|---|---|---|---|---|---|---|---|---|---|---|---|---|---|
| | Feed | Sulfur | Hydrogen Chloride | Catalyst | | | Ethane | Ethylene | Vinyl Chloride | Ethyl Chloride | Ethylene Dichloride | Carbon Disulfide | Tar |
| 1 | Ethane | 106 | 120 | None | 1,300 | 15 | 23 | 40 | 55 | 3 | 2 | 10 | 4 |
| 2 | do | 106 | 120 | Clay | 1,200 | 5 | 31 | 30 | 61 | 6 | 2 | 7 | 2 |
| 3 | do | 212 | 120 | None | 1,400 | 5 | 2 | 46 | 74 | 2 | 1 | 14 | 8 |
| 4 | do | 212 | 240 | do | 1,300 | 5 | 5 | 28 | 97 | 9 | 7 | 11 | 7 |
| 5 | do | 212 | 240 | do | 1,300 | 150 | 26 | 6 | 64 | 27 | 10 | 9 | 14 |
| 6 | do | 212 | 240 | Cr-Al$_2$O$_3$ | 1,150 | 5 | 7 | 29 | 99 | 19 | 4 | 2 | 1 |
| 7 | do | 212 | 240 | Cr-Al$_2$O$_3$ | 950 | 5 | 41 | 17 | 46 | 31 | 9 | <1 | <1 |
| 8 | do | 212 | 180 | Bi-Mo-P | 1,250 | 5 | <1 | 51 | 80 | 11 | <1 | 2 | 1 |
| 9 | Ethane-Ethylene | 212 | 180 | Mo-Al$_2$O$_3$ | 1,200 | 5 | 3 | 56 | 69 | 3 | 4 | 3 | 1 |
| 10 | Ethylene | 106 | 180 | None | 1,150 | 240 | <1 | 58 | 31 | 19 | 11 | 9 | 11 |
| 11 | Ethyl Chloride | 212 | 120 | SiO$_2$-Al$_2$O$_3$ | 1,050 | 50 | <1 | 2 | 36 | 37 | 14 | 6 | 6 |
| 12 | Ethylene Dichloride | 212 | 60 | V-Al$_2$O$_3$ | 1,100 | 5 | <1 | 4 | 32 | 12 | 18 | 5 | <1 | that problems from wet hydrogen chloride are not experienced. Thus, conventional materials such as alloy steels may be readily employed in this process.

FIGURE 2 is an embodiment of the process to maximize yields of vinyl chloride. Hydrogen chloride and ethane are fed from sources 101 and 103, through lines 107 and 109, respectively, to compressor 113 and heater 115 and to the feed-product exchanger 182. A small quantity of makeup molten sulfur is likewise fed to the exchanger by pump 121, taking suction on line 111 from the storage tank 105. The main quantity of sulfur fed issues from line 193, obtained from the hydrogen sulfide reconverter 151, and from the main product splitter 189. As will be described, a low boiling recycle stream comprising ethylene, hydrogen chloride, and ethane also joins the combined feed through line 146 before compressor 113.

The combined feed passes through the feed-product exchanger 182, and is there exchanged with the reaction effluent. The feed then enters the reactor 125 through line 117.

Because the reaction in this case is substantially endothermic, reactor 125 is designed in accordance with conventional tubular furnace construction with air and fuel supplying the necessary heat required. No catalyst is employed in this illustrative case.

Reaction products leave through line 127, pass into the feed-product exchanger 182 through line 183, leave the exchanger substantially cooled at line 185 and are further cooled in exchanger 187 to liquefy unreacted sulfur, carbon disulfide, ethyl chloride, and ethylene dichloride. These are then separated from unliquefied products in tower 189 and pass from the bottom of the tower at 191 to be ultimately recycled back to the reactor via lines 193 and 117. The vapor effluent from tower 189 passes through line 195 and is cooled by exchanger 139 to substantially liquefy vinyl chloride which is then sepa-

I claim:
1. The process of producing unsaturated and saturated chlorine derivatives of ethane, which comprises contacting a hydrocarbon gas containing substantial quantities of ethane with elemental sulfur and hydrogen chloride at a temperature between 700° F. and 1450° F. and a reaction pressure less than 250 p.s.i.g. to obtain substantial conversion of ethane, sulfur, and hydrogen chloride.

2. The process of claim 1 in which a solid contact agent is present in the reaction zone.

3. The process of producing vinyl chloride which comprises reacting ethane, sulfur, and hydrogen chloride in the ratio about 0.5 to 2.5 moles of elemental sulfur ($S_2$) and about 0.5 to 2.5 moles of hydrogen chloride per mole of ethane, within the temperature range of 700° F. to 1450° F. and at a pressure of less than 250 p.s.i.g.

4. The process of producing vinyl chloride which comprises contacting ethane with from 0.5 to 2.5 moles of elemental sulfur (expressed as $S_2$) per mole of ethane and with from 0.5 to 2.5 moles of hydrogen chloride per mole of ethane at between 700° F. and 1450° F.

5. The process of claim 4 wherein the reaction pressure is less than 250 p.s.i.g.

6. The process comprising the steps of feeding ethane, sulfur and hydrogen chloride in the ratio of about 0.5 to 2.5 moles of elemental sulfur ($S_2$) and about 0.5 to 2.5 moles of hydrogen chloride per mole of ethane, into a reaction zone maintained at an elevated temperature, between 700° F. and 1450° F. and at a pressure less than 250 p.s.i.g., whereby to produce vinyl chloride and ethylene, and recycling the ethylene thus produced to said reaction zone to produce additional vinyl chloride.

7. The process comprising the steps of feeding ethane, sulfur and hydrogen chloride in the ratio of about 0.5 to 2.5 moles of elemental sulfur ($S_2$) and about 0.5 to 2.5 moles of hydrogen chloride per mole of ethane, into a reaction zone maintained at an elevated temperature between 700° F. and 1450° F, and at a pressure less than 250 p.s.i.g., whereby to produce vinyl chloride and ethyl chloride, and recycling the ethyl chloride thus produced to said reaction zone to produce additional vinyl chloride.

8. The process comprising the steps of feeding ethane, sulfur and hydrogen chloride in the ratio of about 0.5 to 2.5 moles of elemental sulfur ($S_2$) and about 0.5 to 2.5 moles of hydrogen chloride per mole of ethane, into a reaction zone maintained at an elevated temperature between 700° F. and 1450° F. and at a pressure less than 250 p.s.i.g., whereby to produce vinyl chloride and ethylene dichloride, and recycling the ethylene dichloride thus produced to said reaction zone to produce additional vinyl chloride.

References Cited

FOREIGN PATENTS 704,463   2/1965   Canada.

OTHER REFERENCES

Mellor, Comprehensive Treatise on Inorganic and Theoretical Chemistry, vol. 10, p. 93, QD 31 M4.

BERNARD HELFIN, *Acting Primary Examiner.*

LEON ZITVER, *Examiner.*

J. A. BOSKA, *Assistant Examiner.*